US008817581B1

United States Patent
Tsutsumi et al.

(10) Patent No.: US 8,817,581 B1
(45) Date of Patent: Aug. 26, 2014

(54) THERMALLY-ASSISTED MAGNETIC RECORDING HEAD USING NEAR-FIELD LIGHT

(71) Applicant: TDK Corporation, Tokyo (JP)

(72) Inventors: Takeshi Tsutsumi, Tokyo (JP); Ryo Hosoi, Tokyo (JP); Tetsuya Roppongi, Tokyo (JP); Kosuke Tanaka, Tokyo (JP)

(73) Assignee: TDK Corporation, Tokyo (JP)

( * ) Notice: Subject to any disclaimer, the term of this patent is extended or adjusted under 35 U.S.C. 154(b) by 17 days.

(21) Appl. No.: 13/774,521

(22) Filed: Feb. 22, 2013

(51) Int. Cl.
*G11B 11/00* (2006.01)
*G11B 13/08* (2006.01)

(52) U.S. Cl.
CPC ........................................ *G11B 13/08* (2013.01)
USPC .................. 369/13.13; 369/13.33; 369/13.14; 360/39

(58) Field of Classification Search
None
See application file for complete search history.

(56) References Cited

U.S. PATENT DOCUMENTS

| | | | |
|---|---|---|---|
| 6,768,556 B1 | 7/2004 | Matsumoto et al. | |
| 7,885,029 B2 * | 2/2011 | Miyauchi et al. | 369/13.13 |
| 8,059,496 B1 | 11/2011 | Zhou et al. | |
| 8,208,349 B2 * | 6/2012 | Tanaka et al. | 369/13.33 |
| 8,441,895 B2 * | 5/2013 | Shimazawa et al. | 369/13.33 |
| 2003/0066944 A1 | 4/2003 | Matsumoto et al. | |
| 2005/0078565 A1 | 4/2005 | Peng et al. | |

FOREIGN PATENT DOCUMENTS

| | | |
|---|---|---|
| JP | 2001-255254 A | 9/2001 |
| JP | 2003-114184 A | 4/2003 |
| JP | 2005-116155 A | 4/2005 |
| JP | 2012-022768 A | 2/2012 |

OTHER PUBLICATIONS

U.S. Appl. No. 13/568,542, Not published yet.

* cited by examiner

*Primary Examiner* — Muhammad N Edun
(74) *Attorney, Agent, or Firm* — Posz Law Group, PLC

(57) ABSTRACT

A plasmon generator of a thermally-assisted magnetic recording head has a first configuration member having a near-field light generation end surface at an ABS, and a second configuration member being in contact with main magnetic pole, and terminating at a front end portion of a slope positioned at the position recessed from the ABS. An end part of a separator layer, which is interposed between the main magnetic pole and the first configuration member, on a side opposite to the ABS is at a position more recessed from the air bearing surface than the front end portion of the slope of the second configuration member.

14 Claims, 13 Drawing Sheets

THERMALLY-ASSISTED MAGNETIC RECORDING HEAD USING NEAR-FIELD LIGHT

BACKGROUND OF THE INVENTION

1. Field of the Invention

The present invention relates to a thermally-assisted magnetic recording head performing recording of information by irradiating a magnetic recording medium with near-field light to reduce an anisotropy field (coercive force) of the magnetic recording medium.

2. Description of the Related Art

In the field of magnetic recording using a magnetic head and a magnetic recording medium, along with the advancement of high recording density of a magnetic disk apparatus, further improvement in the performance of a thin film magnetic head and a magnetic recording medium is demanded. As the thin film magnetic head, a composite-type thin film magnetic head is widely used having a structure in which a magnetoresistive (MR) element for reading and an induction-type electromagnetic transducer element (magnetic recording element) are laminated on a substrate. In the magnetic disk apparatus, the thin film magnetic head is provided in a slider that flies slightly above a surface of the magnetic recording medium.

In such a magnetic recording device, along with the advancement of high density in magnetic recording, so-called thermally-assisted magnetic recording is proposed in which a magnetic material with large magnetic anisotropy energy Ku is used as the recording medium, and a magnetic field is applied to perform writing after the coercive force is reduced by applying heat to the magnetic recording medium. In the thermally-assisted magnetic recording, methods in which laser light is used in order to apply heat to the magnetic recording medium are common. Among such methods, there is a method (near-field light heating) in which the laser light is converted to near-field light and in which the magnetic recording medium is heated by irradiating the magnetic recording medium with the near-field light. The near-field light is a kind of electromagnetic field that is formed around a substance and has a property that a diffraction limit due to the wavelength of the light can be ignored. By irradiating a microstructure body with light having aligned wavelengths, near-field light that depends on the scale of the microstructure body is generated, and focusing of the light to a minimum region of about several tens of nm is possible.

A specific configuration of a near-field light probe that generates near-field light is disclosed in JP2001-255254A and JP2003-114184A. The near-field light probe disclosed in JP2001-255254A and JP2003-114184A has a metallic scatter of a shape of a conical body, a triangle and the like. When light is incident onto the scatter of the near-field light probe, near-field light is generated at a vertex portion of the scatter. In a case where such a near-field light probe is used in thermally-assisted magnetic recording, the near-field light probe is arranged in the magnetic recording head in such a manner that the vertex of the scatter is positioned on an air bearing surface (ABS) opposing the recording medium. The scatter is irradiated with light from an opposite side of the ABS, and near-field light is radiated from the vertex of the scatter toward the recording medium. Such a near-field light probe is referred to as a plasmon antenna.

However, in a method in which the plasmon antenna is directly irradiated with light as described above, the efficiency of converting the light radiated onto the plasmon antenna to the near-field light is low. Most of the energy of the light radiated onto the plasmon antenna is reflected at the surface of the plasmon antenna or converted into heat. The vertex (near-field light generator) of the plasmon antenna is formed to have a dimension smaller than the wavelength of the light. Therefore, the volume of the plasmon antenna is small. Thus, in the plasmon antenna, temperature rise accompanying the conversion of the energy of the incident light to heat is very large. Due to this temperature rise, the plasmon antenna causes volume expansion. If such a plasmon antenna is arranged on the ABS of the thermally-assisted magnetic recording head that opposes the magnetic recording medium, the plasmon antenna protrudes from the ABS due to the volume expansion. In order to prevent the magnetic recording head from contacting the magnetic recording medium during the expansion, an end part of the MR element positioned on the ABS is kept far away from the magnetic recording medium. As a result, a problem occurs that, for example, signals recorded in the magnetic recording medium cannot be read during a recording operation, which impairs the reliability of the recording head. Further, when heat generation is large, problems occur, such as breakage (e.g., melting) of the plasmon antenna, degradation in performance (heating capability) that accompanies deformation due to migration of the material that configures the plasmon antenna, and damage to the magnetic recording medium.

Therefore, thermally-assisted magnetic recording heads using surface plasmon are proposed in JP2005-116155A and JP2012-22768A. In these thermally-assisted magnetic recording heads, instead of being directly radiated to the plasmon antenna, propagation light that propagates through a waveguide couples with the plasmon generator in a surface plasmon mode via a cladding layer. The light propagating through the waveguide is totally reflected at an interface between the waveguide and the cladding layer. In this case, light that is referred to as evanescent light and that exudes to the cladding layer is generated. The evanescent light and collective oscillations of electric charges in the plasmon generator are coupled, and surface plasmons are excited in the plasmon generator. The excited surface plasmons propagate to a near-field light generation end surface that is an ABS side end part of the plasmon generator, and near-field light is generated at the near-field light generation end surface.

However, even for a thermally-assisted magnetic recording head using the surface plasmons, temperature rise to some extent in the plasmon generator onto which the light is focused cannot be avoided, and additional measures are required to prevent overheating. To prevent overheating in the plasmon generator, it is effective that a structure body having a large volume is provided in contact with the plasmon generator or is integrally provided with the plasmon generator to function as a heat sink. Because the structure body is in contact with the plasmon generator or is integrated with the plasmon generator, the structural body must be made of a material (specifically, noble metal such as Au and Ag that can be used as the material of the plasmon generator) that does not interfere with the generation of the near-field light. From a point of view of heat dissipation efficiency, it is preferable that the structure body be exposed on the ABS. However, in practice, it is difficult to expose the structure body on the ABS due to an influence on the near-field light and a problem when processing the slider.

Further, a main magnetic pole for applying a writing magnetic field to the recording medium is provided above the plasmon generator. A separator layer that does not absorb much of the near-field light is provided between the near-field light generation end surface, which is the ABS side end part of the plasmon generator, and the main magnetic pole.

SUMMARY OF THE INVENTION

A purpose of the present invention is to provide a thermally-assisted magnetic recording head that allows heat of a plasmon generator to be efficiently dissipated and that achieves excellent generation of near-field light and application of a writing magnetic field from a main magnetic pole.

A thermally-assisted magnetic recording head of the present invention that has an air bearing surface opposing a magnetic recording medium and that performs magnetic recording while heating the magnetic recording medium by using near-field light includes: a waveguide through which incident light propagates toward the air bearing surface; a main magnetic pole of which one end part is positioned at the air bearing surface; a plasmon generator that is positioned between the waveguide and the main magnetic pole, that is provided along the waveguide in a manner opposing the waveguide, and of which one end part is positioned at the air bearing surface, and a separator layer that is interposed between the main magnetic pole and a first configuration member of the plasmon generator, and that extends from a position recessed from the air bearing surface to the air bearing surface. The plasmon generator includes: the first configuration member that extends to the air bearing surface; and a second configuration member that is provided to be in contact with the first configuration member or is integrally provided with the first configuration member, and that is in contact with main magnetic pole, the second configuration member terminating at a position recessed from the air bearing surface without extending to the air bearing surface. The first configuration member has a near-field light generation end surface at the one end part positioned at the air bearing surface, and the second configuration member terminates at a front end portion of a slope positioned at the position recessed from the air bearing surface. An end part of the separator layer on a side opposite to the air bearing surface is at a position more recessed from the air bearing surface than the front end portion of the slope of the second configuration member.

The separator layer penetrates into on interior of the second configuration member, and a portion of the second configuration member overlaps on top of a portion of the separator layer.

The first configuration member of the plasmon generator couples in a surface plasmon mode with light propagating through the waveguide to generate surface plasmons, allows the surface plasmons to propagate toward the air bearing surface, and generates near-field light at the near-field light generation end surface.

A manufacturing method of the present invention of a thermally-assisted magnetic recording head that has an air bearing surface opposing a magnetic recording medium and that performs magnetic recording while heating the magnetic recording medium by using near-field light includes: a step of forming a first configuration member on a waveguide, the waveguide allowing incident light to propagate therethrough toward the air bearing surface, the first configuration member extending to the air bearing surface along the waveguide in a manner opposing the waveguide and having a near-field light generation end surface on the air bearing surface; a step of forming a separator layer on the first configuration member, the separator layer extending from a position recessed from the air bearing surface to the air bearing surface; a step of forming a second configuration member on the separator layer and the first configuration member, the second configuration member terminating without extending to the air bearing surface, configuring a plasmon generator together with the first configuration member; and a step of forming a main magnetic pole in contact with the second configuration member in such a manner that, at least at the air bearing surface, the main magnetic pole opposes the first configuration member via the separator layer. In the step of forming the second configuration member, a slope is formed to have a front end portion at a position recessed from the air bearing surface, said front end portion being positioned closer to the air bearing surface than an end part of the separator layer on a side opposite to the air bearing surface. The second configuration member terminates at the front end portion of the slope.

According to the present invention, the front end portion of the slope at which the second configuration member of the plasmon generator terminates can be arranged close to the ABS regardless of the length of the separator layer. For example, in a thermally-assisted magnetic recording head described in U.S. patent application Ser. No. 13/568,542, a second configuration member does not overlap a separator layer (nonmagnetic insulating material layer). Therefore, when a long separator layer is provided in a manner that absorption of surface plasmons by a main magnetic pole can be sufficiently suppressed, a front end portion of the second configuration member is distant away from the ABS. However, in the present invention, the second configuration member overlaps the separator layer, and, while ensuring a sufficient length of the separator layer, the front end portion of the second configuration member can be arranged close to the ABS. Thereby, the volume and surface area of the second configuration member can be increased. Therefore, the heat dissipation effect can be increased, and overheating of the plasmon generator can be prevented. In addition, because the main magnetic pole is not made small, and because distance between the main magnetic pole and the near-field light generation end surface is not increased, sufficient heating of the magnetic recording medium and application of a writing magnetic field can be performed to achieve excellent thermally-assisted magnetic recording.

The above-described purpose, features and advantages and other purposes, features and advantages of the present invention will be clear by reading the following explanation with reference to the accompanying drawings that illustrate the embodiments of the present invention.

DESCRIPTION OF THE PREFERRED EMBODIMENTS

A thermally-assisted magnetic recording head of the present invention is explained with reference to the drawings.

First, a basic configuration of a main part of a thermally-assisted magnetic recording head 1 of the present invention is explained. The thermally-assisted magnetic recording head 1 performs so-called thermally-assisted magnetic recording in which information is recorded by applying a magnetic field in a state in which a coercive force has been partially reduced by applying heat to a magnetic recording medium 17. In the following explanation, a width direction of an air bearing surface (ABS) of the magnetic recording head 1, a height direction of the ABS, and a depth direction orthogonal to the ABS are respectively illustrated as an X-direction, a Z-direction, and a Y-direction, the ABS opposing the magnetic recording medium 17.

Figure 1:
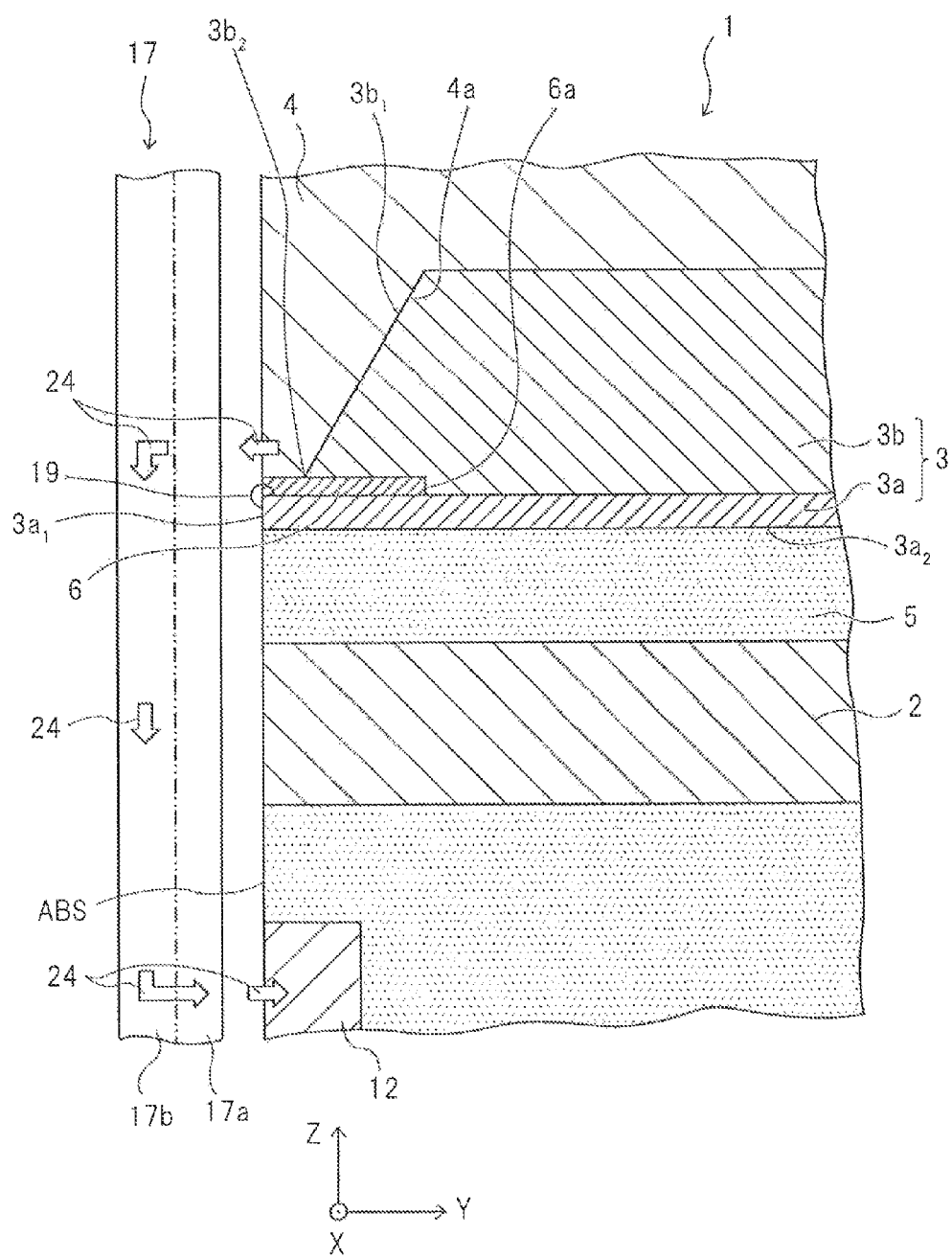
FIG. 1 is a cross-sectional view of a main part of a thermally-assisted magnetic recording head according to a first embodiment of the present invention.
Figure 2:
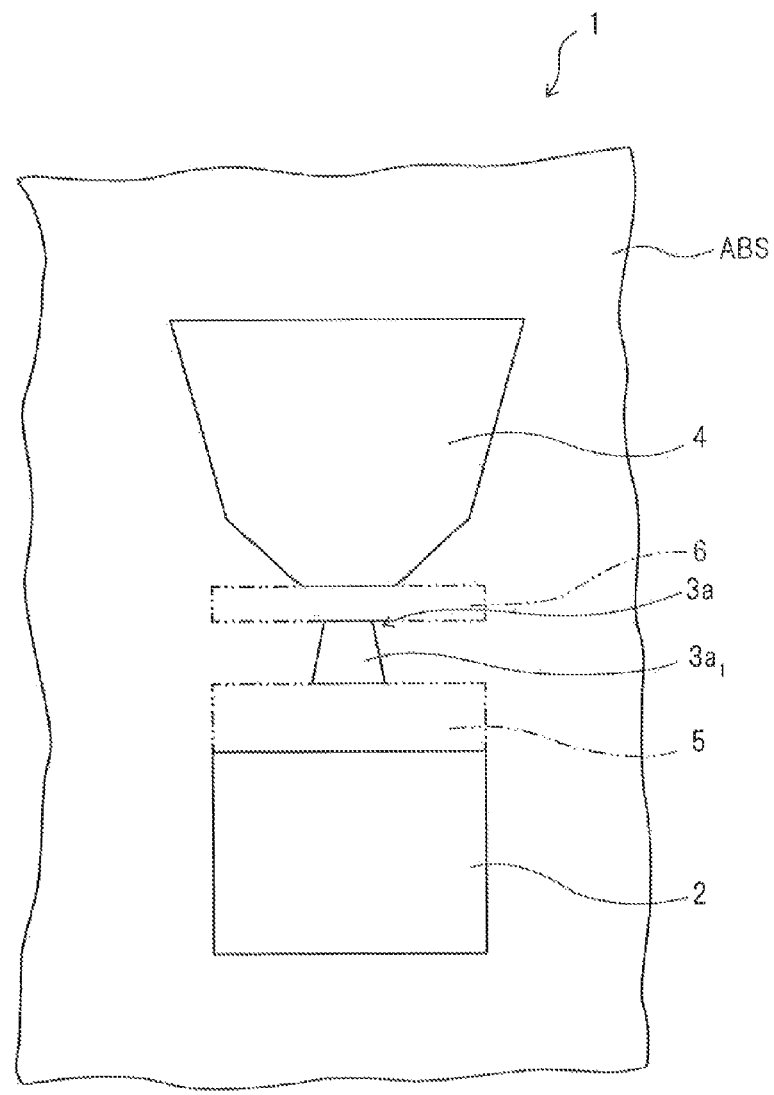
FIG. 2 illustrates an ABS of the main part of the thermally-assisted magnetic recording head according to the first embodiment.
Figure 2:
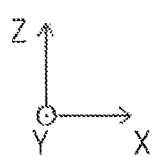

As illustrated in FIGS. 1 and 2, the thermally-assisted magnetic recording head 1 includes a waveguide (core) 2 onto which laser light used for heating the magnetic recording medium 17 is incident. The waveguide 2 can be formed, for example, with $TaO_x$. $TaO_x$ means tantalum oxide of any composition. Typical examples of $TaO_x$ include, but not limited to, $Ta_2O_5$, TaO, $TaO_2$, and the like.

A plasmon generator 3 is provided in a manner opposing a part of the waveguide 2. The plasmon generator 3 is formed from Au, Ag, Cu, Al, Pd, Ru, Pt, Rh, Ir or an alloy having these metals as a main component, and extends to the ABS. The plasmon generator 3 has a near-field light generation end surface $3a_1$ on an ABS side end part. The near-field light generation end surface $3a_1$, on the ABS, opposes the magnetic recording medium 17.

A main magnetic pole 4 is provided on the plasmon generator 3. The main magnetic pole 4 is exposed on the ABS and opposes the magnetic recording medium 17. The main magnetic pole 4 is formed with an alloy that is formed from any two or three of Ni, Fe and Co.

A cladding layer 5 is provided below the plasmon generator 3 and between the plasmon generator 3 and the waveguide 2. The cladding layer 5 can be formed, for example, with $AlO_x$. Here, $AlO_x$ means aluminum oxide of any composition. A typical example of $AlO_x$ is, but not limited to, $Al_2O_3$.

Further, a return shield layer 12 is provided below the waveguide 2. The return shield layer 12 is formed with an alloy that is formed from any two or three of Ni, Fe and Co. Magnetic flux 24 that is generated by passing a current to a coil 15 (see FIG. 12) (to be described later) is emitted from a tip end portion of the main magnetic pole 4 toward the magnetic recording medium 17, travels along a perpendicular direction (Y-direction) through a recording layer 17a that is a surface layer of the magnetic recording medium 17 for perpendicular magnetic recording, and magnetizes each recording bit of the recording layer 17a along the perpendicular direction. After passing through the recording layer 17a and in an under layer 17b that is below the recording layer 17a and that is made of a soft magnetic material, the magnetic flux 24 changes a magnetic path to a surface direction (Z-direction) of the magnetic recording medium 17. The magnetic flux 24 further changes orientation again to the perpendicular direction (Y-direction) in the vicinity of the return shield layer 12 and is absorbed by the return shield layer 12. That is, the return shield layer 12 plays the role of controlling the magnetic flux 24 in such a manner that the magnetic flux 24 perpendicularly passes through the recording layer 17a and travels a U-shape magnetic path.

In the thermally-assisted magnetic recording head 1, propagation light that propagates through the waveguide 2 is coupled with the plasmon generator 3 in a surface plasmon mode via the cladding layer 5 to excite surface plasmons in the plasmon generator 3. The excited surface plasmons propagate along a surface of a surface plasmon mode coupling part $3a_2$ of the plasmon generator 3 to the near-field light generation end surface $3a_1$ to generate near-field light at the near-field light generation end surface $3a_1$. In FIG. 1, a region 19 where the near-field light is generated is schematically illustrated. In this way, by irradiating the magnetic recording medium 17 with the near-field light, the magnetic recording medium 17 is partially heated and the coercive force is reduced. By applying a magnetic field from the main magnetic pole 4 to the portion where the coercive force is reduced, as mentioned above, thermally-assisted magnetic recording to the magnetic recording medium 17 is performed.

In the present invention, in order to prevent overheating the plasmon generator 3, a structure body (heat sink) having a heat dissipation effect is provided. Specifically, the plasmon generator 3 of the present invention includes a first configuration member 3a and a second configuration member 3b that is integrally provided on top of the first configuration member 3a and that functions as a heat sink. The first configuration member 3a includes the near-field light generation end surface $3a_1$ that generates near-field light and the surface plasmon mode coupling part $3a_2$ that couples in the surface plasmon mode with the propagation light propagating through the waveguide 2. Similar to a conventional plasmon generator, the first configuration member 3a has a cross-sectional shape of a certain quadrangle (rectangle, trapezoid, or inverted trapezoid) and extends to the ABS. The cross-sectional shape of the first configuration member 3a, that is, shape and dimensions of the near-field light generation end surface $3a_1$ at the ABS, are set to be a relatively small quadrangle, for example, that has a height (thickness) in the Z-direction of about 40-120 nm, in order to generate near-field light to satisfactorily perform the thermally-assisted magnetic recording. The second configuration member 3b is formed of the same material as that of the first configuration member 3a, and, as illustrated in FIG. 1, is integrally joined to the top of the first configuration member 3a. An ABS side end part of the second configuration member 3b, without reaching the ABS, stops at a slope $3b_1$ at a position recessed from the ABS. A portion of the second configuration member 3b excluding the slope $3b_1$ has a height (thickness) in the Z-direction of about 50-200 nm. It is also possible to have a configuration in which the second configuration member 3b is formed of a material different from that of the first configuration member 3a and at least a portion of the second configuration member 3b is in contact with the first configuration member 3a.

A separator layer 6 that is made of a material (for example, aluminum oxide) that does not absorb much of the near-field light is interposed between the first configuration member 3a, and the main magnetic pole 4 and a portion (on the ABS side) of the second configuration member 3b. The separator layer 6, when viewed in the Y-direction, extends from a position that is recessed from the ABS to the ABS. The separator layer 6 penetrates into a position (inner part) that is more recessed from the ABS than the slope $3b_1$ of the second configuration member 3b. That is, an end part 6a of the separator layer 6 on a side opposite to the ABS is at a position that is more recessed from the ABS as compared to a front end portion $3b_2$ of the slope $3b_1$ of the second configuration member 3b, that is, $6a > 3b_2$ when expressed using coordinates in the Y-direction with a direction toward the ABS as a negative (−) direction and a direction away from the ABS as a positive (+) direction. However, the end part 6a of the separator layer 6 on the side opposite to the ABS may also be positioned at a position opposing an intermediate part (middle) of the slope $3b_1$ in the depth direction (Y-direction) as far as the position is more recessed from the ABS than the front end portion $3b_2$ of the slope $3b_1$ of the second configuration member 3b. The separator layer 6 is made of oxide or nitride (such as alumina, silica and MgO) or a lamination film of the oxide or nitride, the oxide or nitride having transparency to the light (laser light) that propagates through the waveguide 2.

Technical significance of this configuration is explained in the following. The second configuration member 3b is mainly used as a heat sink for preventing overheating of the first configuration member 3a. In order to achieve sufficient heat dissipation effect as a heat sink, a volume and a surface area, large to some extent, are required. Further, when a distance between the near-field light generation end surface $3a_1$ of the first configuration member 3a and the main magnetic pole 4 is large at the ABS, a portion that is heated by the irradiation of the near-field light and a portion onto which a writing magnetic field is applied are positioned away from each other at the magnetic recording medium 17. Therefore, high-density thermally-assisted magnetic recording cannot be effectively performed in which writing to a small portion where the coercive force is sufficiently reduced is performed. That is, at least at the ABS, the distance between the near-field light generation end surface $3a_1$ of the first configuration member 3a and the main magnetic pole 4 must be small and it is not preferable that the second configuration member 3b is interposed between the two. Further, in order to apply a satisfactory writing magnetic field from the main magnetic pole 4, at least in the vicinity of the ABS, it is not preferable that the volume of the main magnetic pole 4 is small. Therefore, in order to reduce the distance between the near-field light generation end surface $3a_1$ of the first configuration member 3a and the main magnetic pole 4, the front end portion $3b_2$ of the slope $3b_1$ of the second configuration member 3b is recessed from the ABS, and, in order to increase the volumes and surface areas of both the second configuration member 3b and the main magnetic pole 4, slopes $3b_1$, 4a are respectively formed in the second configuration member 3b and the main magnetic pole 4 and the slopes $3b_1$, 4a overlap each other forming a laminated form. The slope $3b_1$ has an inclination angle of, for example, 30-60 degrees.

Figure 3A:
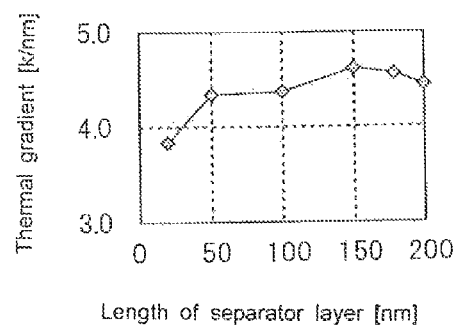
FIG. 3A is a graph illustrating a relation between a length of a separator layer of the thermally-assisted magnetic recording head according to the first embodiment and a thermal gradient at a recording point of a magnetic recording medium.
Figure 3B:
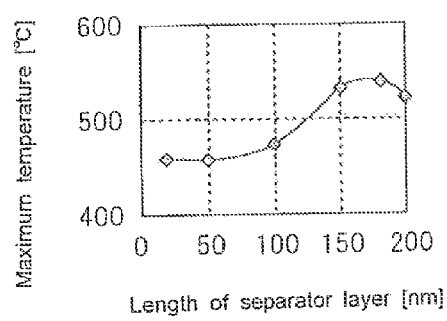
FIG. 3B is a graph illustrating a relation between the length of the separator layer of the thermally-assisted magnetic recording head according to the first embodiment and a maximum temperature in a recording layer of the magnetic recording medium that has been heated.
Figure 3C:
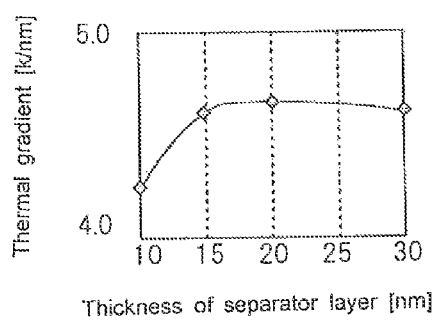
FIG. 3C is a graph illustrating a relation between a thickness of the separator layer of the thermally-assisted magnetic recording head according to the first embodiment and the thermal gradient at the recording point of the magnetic recording medium.
Figure 3D:
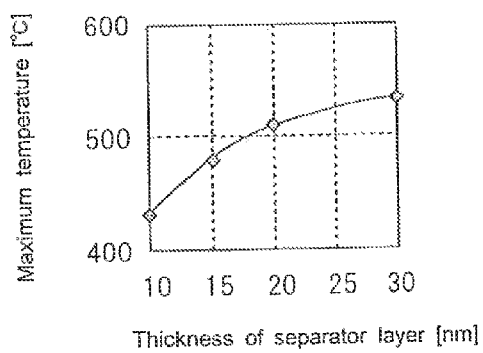
FIG. 3D is a graph illustrating a relation between the thickness of the separator layer of the thermally-assisted magnetic recording head according to the first embodiment and the maximum temperature in the recording layer of the magnetic recording medium that has been heated.

In such a configuration, in order to obtain a higher heat dissipation effect, it is preferable that the front end portion $3b_2$ of the slope $3b_1$ of the second configuration member 3b is positioned further closer to the ABS. However, in order to obtain desired characteristics of the magnetic recording head by suppressing absorption of the surface plasmons, which are generated in and propagate through the plasmon generator 3, by the main magnetic pole 4, it is necessary that the separator layer 6 that is positioned between the first configuration member 3a and the main magnetic pole 4 be formed to have predetermined dimensions. For example, FIGS. 3A-3D illustrate relations between dimensions of the separator layer 6 and characteristics of the magnetic recording head 1 in an embodiment of the present invention. FIG. 3A illustrates a relation between the length in the Y-direction of the separator layer 6 and a thermal gradient at a recording point of the magnetic recording medium 17 when the magnetic recording medium 17 is heated by the magnetic recording head 1. FIG. 3B illustrates a relation between the length in the Y-direction of the separator layer 6 and a maximum temperature in the recording layer of the magnetic recording medium 17 when the magnetic recording medium 17 is heated by the magnetic recording head 1. FIG. 3C illustrates a relation between a thickness in the Z-direction of the separator layer 6 and the thermal gradient at the recording point of the magnetic recording medium 17 when the magnetic recording medium 17 is heated by the magnetic recording head 1. FIG. 3D illustrates a relation between the thickness in the Z-direction of the separator layer 6 and the maximum temperature in the recording layer of the magnetic recording medium 17 when the magnetic recording medium 17 is heated by the magnetic recording head 1. Referring to FIGS. 3A-3D, in both the case where the length in the Y-direction of the separator layer 6 is short and the case where the thickness in the Z-direction of the separator layer 6 is thin, both characteristics of the thermal gradient and characteristics of the maximum temperature of the magnetic recording medium 17 deteriorate. That is, both the length in the Y-direction and the thickness in the Z-direction of the separator layer 6 affect the absorption of light.

As described above, in order to suppress overheating by increasing the volume and surface area of the second configuration member 3b to enhance the heat dissipation effect, it is preferable that the front end portion $3b_2$ of the slope $3b_1$ of the second configuration member 3b is positioned further closer to the ABS. However, suppose, for that purpose, that the separator layer 6 is made to have dimensions smaller than those predetermined, the effect of suppressing absorption of the surface plasmons by the main magnetic pole 4 is reduced and, as illustrated in FIGS. 3A-3D, the characteristics of the magnetic recording head 1 deteriorate. Therefore, this is not preferable. Therefore, in the present invention, in order to position the front end portion $3b_2$ of the slope $3b_1$ of the second configuration member 3b further closer to the ABS without having to make the separator layer 6 small, a configuration is adopted in which the separator layer 6 penetrates toward the direction opposite to the ABS into the interior of the second configuration member 3b. Thereby, the separator layer 6 is kept to have the predetermined dimensions, and desired characteristics of the magnetic recording head 1 can be obtained. In addition, the volume and surface area of the second configuration member 3b can be increased to further improve the heat dissipation effect. These points will be explained later in detail with reference to the drawings.

In this way, in the configuration illustrated in FIGS. 1 and 2, the separator layer 6 that is positioned between the first configuration member 3a and the main magnetic pole 4 penetrates toward the direction opposite to the ABS into the interior of the second configuration member 3b, and the front end portion $3b_2$ of the slope $3b_1$ of the second configuration member 3b is positioned further closer to the ABS by overlapping the front end portion $3b_2$ on top of the separator layer 6. That is, the end part 6a of the separator layer 6 on the side opposite to the ABS and the front end portion $3b_2$ of the slope $3b_1$ of the second configuration member 3b are formed in such a manner that $6a > 3b_2$ in the Y-direction. Thus, as described above, desired characteristics of the magnetic recording head 1 can be ensured and the heat dissipation effect for preventing overheating of the plasmon generator 3 can be improved. Further, particularly at the ABS and in its vicinity, by increasing the volume and surface area of the main magnetic pole 4, a sufficient writing magnetic field can be applied, and, by decreasing the distance between the main magnetic pole 4 and the near-field light generation end surface $3a_1$ of the first configuration member 3a, the efficiency of the thermally-assisted magnetic recording can be increased and the performance of the magnetic recording can be improved.

Figure 4A:
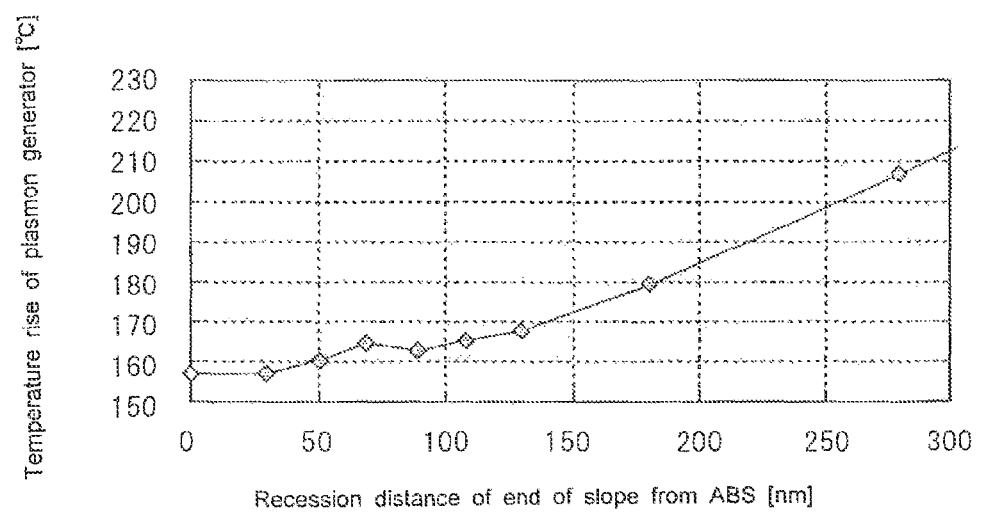
FIG. 4A is a graph illustrating a relation between a recession distance from an ABS of an end part of a slope of the thermally-assisted magnetic recording head according to the first embodiment and a temperature rise in a plasmon generator.
Figure 4B:
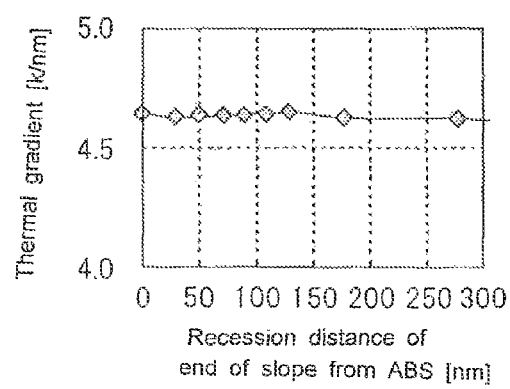
FIG. 4B is a graph illustrating a relation between the recession distance from the ABS of the end part of the slope of the thermally-assisted magnetic recording head according to the first embodiment and the thermal gradient at the recording point of the magnetic recording medium.
Figure 4C:
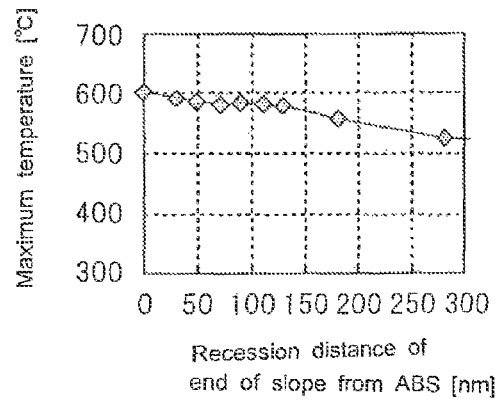
FIG. 4C is a graph illustrating a relation between the recession distance from the ABS of the end part of the slope of the thermally-assisted magnetic recording head according to the first embodiment and the maximum temperature in the recording layer of the magnetic recording medium that has been heated.

The recession distance of the front end portion $3b_2$ of the slope $3b_1$ of the second configuration member 3b from the ABS (the distance in the Y-direction between the front end portion $3b_2$ and the ABS) affects the heat dissipation effect of the second configuration member 3b and thus the magnitude of the temperature rise in the plasmon generator 3 itself. Therefore, FIG. 4A illustrates a relation between the recession distance of the front end portion $3b_2$ of the slope $3b_1$ from the ABS and the magnitude of the temperature rise in the plasmon generator 3. FIG. 4B illustrates a relation between the recession distance of the front end portion $3b_2$ from the ABS and the thermal gradient at the recording point of the magnetic recording medium 17 when the magnetic recording medium 17 is heated by the magnetic recording head 1. FIG. 4C illustrates a relation between the recession distance of the front end portion $3b_2$ from the ABS and the maximum temperature in the recording layer of the magnetic recording medium 17 when the magnetic recording medium 17 is heated by the magnetic recording head 1.

From FIGS. 3A and 3B, it is clear that it is preferable that the separator layer 6 has a length of about 150 nm or more in order to ensure a large thermal gradient and a high maximum temperature of the magnetic recording medium 17. Suppose that the second configuration member is designed not to overlap the separator layer, in the case where the separator layer is formed to extend over a distance of 150 nm from the ABS, the front end portion of the second configuration member cannot be positioned within this region (a range of 150 nm from the ABS); that is, the second configuration member has to be formed in such a manner that the front end portion is positioned 150 nm or more away from the ABS. This means the volume of the second configuration member is small, and accordingly, the heat dissipation effect is reduced. For example, referring to FIG. 4A, in the case where the front end portion of the second configuration member is positioned 150 nm or more away from the ABS, the temperature rise of the plasmon generator 3 is 170° C. or more.

However, in the present invention, the second configuration member 3b is formed to overlap on top of the separator layer 6. Therefore, the front end portion $3b_2$ can be positioned closer to the ABS. When the front end portion $3b_2$ is positioned closer to the ABS, the volume of the second configuration member 3b can be increased. Therefore, a larger heat dissipation effect can be obtained. Specifically, as illustrated in FIG. 4A, when the second configuration member 3b is formed in such a manner that the front end portion $3b_2$ is positioned 50 nm away from the ABS, the temperature rise of the plasmon generator 3 is 160° C. or less. As compared to the case where the front end portion is positioned 150 nm away from the ABS, the temperature rise of the plasmon generator 3 can be reduced by about 10-25 degrees, which is preferable. As illustrated in FIGS. 4B and 4C, even when the recession distance of the front end portion $3b_2$ from the ABS is small, the thermal gradient is not reduced and the maximum temperature of the magnetic recording medium 17 even increases (rises). Therefore, there is no problem to position the front end portion $3b_2$ of the second configuration member 3b close to the ABS.

As described above, in the present invention, a configuration is adopted in which the separator layer 6 penetrates into the interior of the second configuration member 3b and a portion of the second configuration member 3b overlaps a portion of the separator layer 6. Therefore, a particular effect is obtained that a desired length (for example, 150-200 nm) of the separator layer 6 and a desired recession distance (for example, 50 nm or less) of the front end portion $3b_2$ of the slope $3b_1$ of the second configuration member 3b from the ABS can be simultaneously realized.

From FIGS. 3C and 3D, it is clear that, from a point of view of the thermal gradient and the maximum temperature of the magnetic recording medium 17, the separator layer 6 is preferably thick. However, when the separator layer 6 is too thick, the main magnetic pole 4 is far away from the near-field light generation end surface $3a_1$ at the ABS. Therefore, the performance of the recording to the magnetic recording medium 17 by the magnetic field applied from the main magnetic pole 4 is reduced. Thus, it is not preferable that the separator layer 6 is extremely thick. As will be described later, it is preferable that the separator layer 6 is accurately formed by using an etching stopper 20. According to FIGS. 3C and 3D, a preferred range for the thickness of the separator layer 6 is approximately 15-30 nm.

Figure 5A:
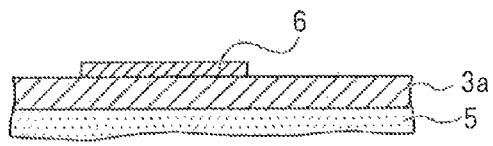
FIGS. 5A-5F are cross-sectional views sequentially illustrating main parts of a manufacturing method of the thermally-assisted magnetic recording head according to the first embodiment.
Figure 5B:
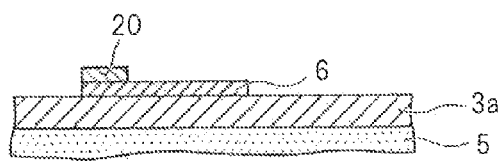

An example of a manufacturing method of the magnetic recording head 1 is now explained. Here, as illustrated in FIGS. 5A-5F, a process of forming the separator layer 6, the second configuration member 3b and the main magnetic pole 4 on top of the first configuration member 3a of the plasmon generator 3 is explained. First, as illustrated in FIG. 5A, the separator layer 6 is formed on top of the first configuration member 3a that has been formed on top of the cladding layer 5. Next, as illustrated in FIG. 5B, the etching stopper layer 20 is formed on top of the separator layer 6. The etching stopper layer 20 prevents the separator layer 6 from being etched during an etching process such as ion milling (to be described later) and defines the position of the front end portion $3b_2$ of the slope $3b_1$ of the second configuration member 3b.

Figure 5C:
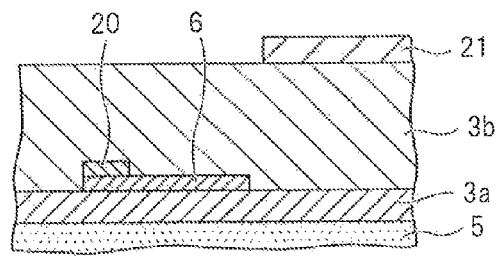
Figure 5D:
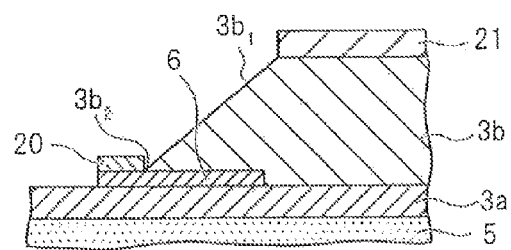
Figure 5E:
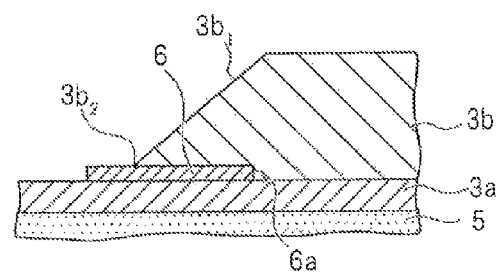
Figure 5F:
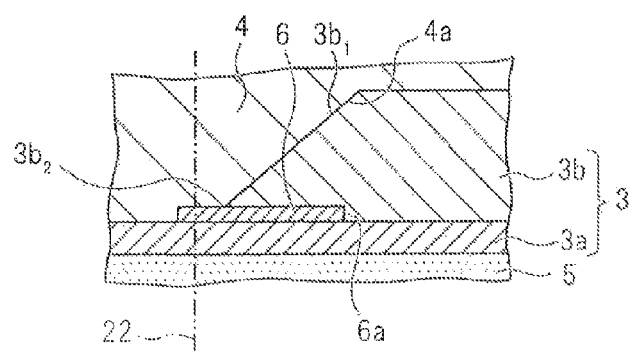

As illustrated in FIG. 5C, the second configuration member 3b is formed. At this time, the second configuration member 3b is not yet in a desired shape, but is formed as a flat layer without the slope $3b_1$. An anti-etching resist 21 is laminated on a place on the second configuration member 3b, excluding a portion where the slope $3b_1$ will be formed. Next, as illustrated in FIG. 5D, etching such as ion milling is performed. At this time, the portion of the second configuration member 3b that is covered by the resist 21 is not etched. The portion that is not covered by the resist 21 is removed in such a manner that the thickness of this portion gradually decreases from a portion close to the resist 21 toward a portion close to the etching stopper layer 20, and the slope $3b_1$ is formed. The separator layer 6 is covered by the second configuration member 3b and the etching stopper layer 20 and is thus not removed. Then, as illustrated in FIG. 5E, the etching stopper layer 20 and the resist 21 are removed. On top of the plasmon generator 3 and the separator layer 6 that are formed as described above, the main magnetic pole 4 is formed, as illustrated in FIG. 5F. Thereafter, at an appropriate timing (for example, after various other layers are formed), by removing along a line 22, the magnetic recording head 1 in a desired shape is formed. The end surface after the removal along the line 22 forms the ABS.

According to this manufacturing method, the magnetic recording head 1 of the present invention can be easily and accurately manufactured. In particular, instead of using a liftoff method in which a layer of a desired shape including the slope $3b_1$ is laminated on top of the first configuration member 3a, the second configuration member 3b of the plasmon generator 3 is processed into the desired shape by etching after forming a flat layer. Thereby, the shape of the slope $3b_1$, the position of the front end portion $3b_2$, and the like, can be more accurately formed. In particular, as described above, the position (the recession distance from the ABS) of the front end portion $3b_2$ of the second configuration member 3b affects the performance of the thermally-assisted magnetic recording. Therefore, it is highly preferable that high-accuracy processing is possible by using etching instead of a liftoff method. Further, as described above, the length and thickness of the separator layer 6 also greatly affect the performance of the thermally-assisted magnetic recording. Therefore, in the present embodiment, it is highly effective to maintain dimensional accuracy by using the etching stopper layer 20 to protect the separator layer 6.

Figure 6:
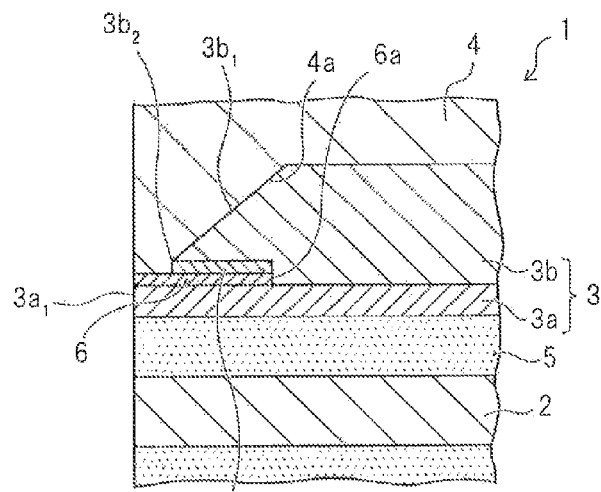
FIG. 6 is a cross-sectional view of a main part of a thermally-assisted magnetic recording head according to a second embodiment of the present invention.
Figure 7A:
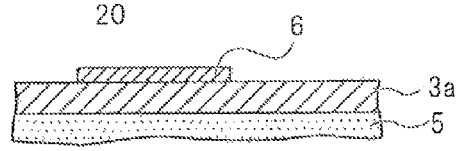
FIGS. 7A-7E are cross-sectional views sequentially illustrating main parts of a manufacturing method of the thermally-assisted magnetic recording head according to the second embodiment.
Figure 7B:
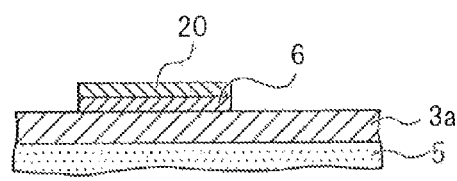
Figure 7C:
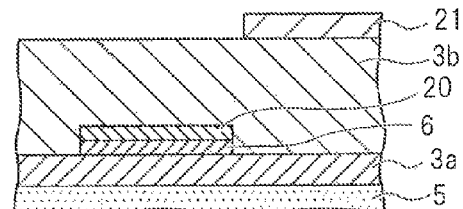
Figure 7D:
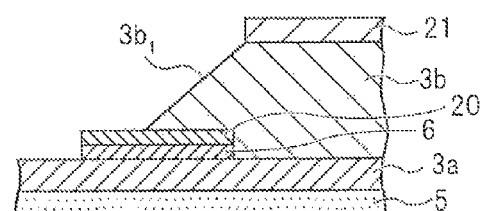
Figure 7E:
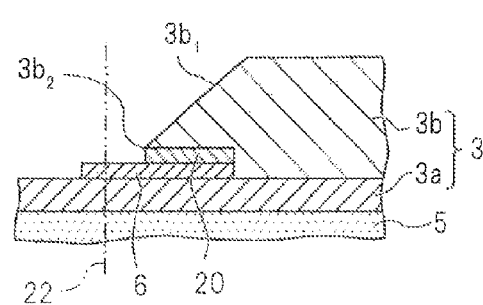

Next, other embodiments of the thermally-assisted magnetic recording head 1 of the present invention are explained. A second embodiment of the thermally-assisted magnetic recording head 1 of the present invention is illustrated in FIGS. 6-7E. In the present embodiment, the etching stopper layer 20 is formed of a material that can be selectively removed (for example, alumina and MgO that can be removed by wet etching; or Ta, Ti and Ru, or a lamination film of Ta, Ti and Ru, which can be removed by Reactive Ion Etching (RIE)), and is removed at a position aligned with the front end portion $3b_2$ of the slope $3b_1$ of the second configuration member 3b. Other configurations are the same as the above-described first embodiment. Although not illustrated in the drawings, the etching stopper layer 20 may adopt a multilayer structure including an under layer below the layer of the selectively-removable material described above.

A manufacturing method of the thermally-assisted magnetic recording head 1 of the present embodiment is similar to that of the thermally-assisted magnetic recording head 1 of the first embodiment and includes the following. The separator layer 6 is formed on top of the first configuration member 3a (FIG. 7A). The etching stopper layer 20 is formed on top of the separator layer 6, the etching stopper layer 20 being formed of a selectively removable material and having the same length as the separator layer 6 (FIG. 7B). Then, the second configuration member 3b in a flat shape is formed and the anti-etching resist 21 is formed on a place excluding a portion where the slope $3b_1$ will be formed (FIG. 7C). Etching such as ion milling is performed and the slope $3b_1$ is formed in the second configuration member 3b (FIG. 7D). Next, in the present embodiment, by selective etching, the etching stopper layer 20 is removed in such a manner that the etching stopper layer 20 aligns with the front end portion $3b_2$ of the slope $3b_1$, and the resist 21 is removed (FIG. 7E). Thereafter, the main magnetic pole 4 is formed, and, at an appropriate timing (for example, after various other layers are formed), by removing along the line 22, the magnetic recording head 1 as illustrated in FIG. 6 is formed. According to the present embodiment, the separator layer 6 can be protected by preventing the separator layer 6 from being unintentionally removed. Further, by using selective etching to remove the etching stopper layer 20 in the manner that the etching stopper layer 20 aligns with the front end portion $3b_2$ of the slope $3b_1$, the distance between the main magnetic pole 4 and the first configuration member 3a of the plasmon generator 3 is not increased.

Figure 8:
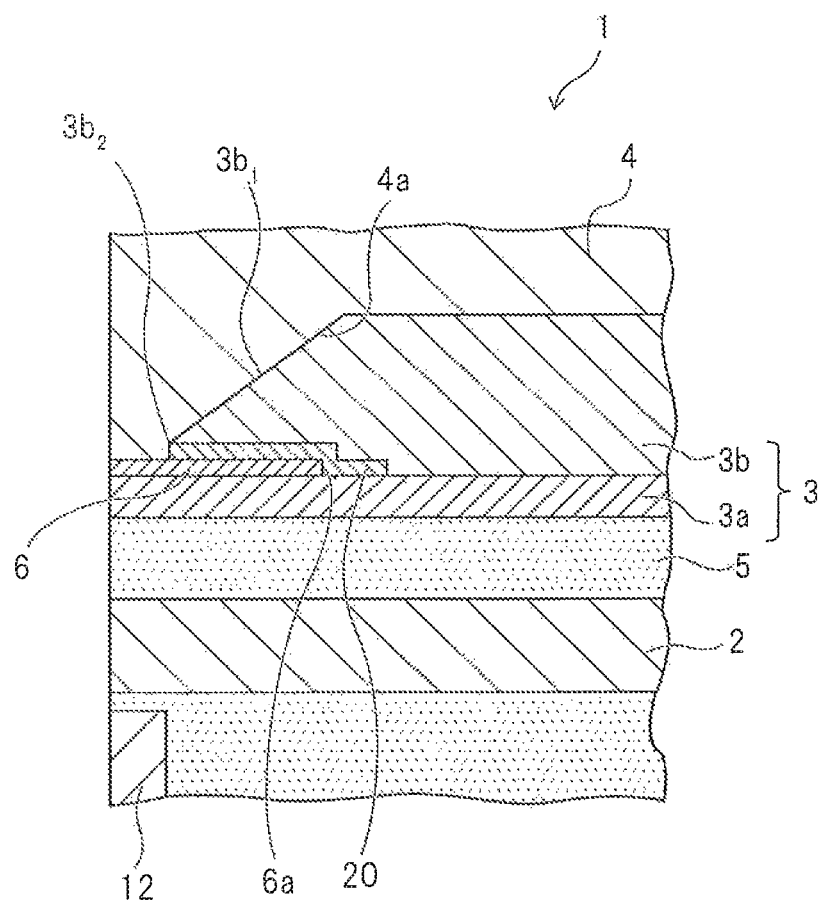
FIG. 8 is a cross-sectional view of a main part of a thermally-assisted magnetic recording head according to a third embodiment of the present invention.

A third embodiment of the thermally-assisted magnetic recording head 1 of the present invention is illustrated in FIG. 8. In the present embodiment, the etching stopper layer 20 of the same material as in the second embodiment is formed in a manner to cover the end part 6a of the separator layer 6. Other configurations are the same as the second embodiment. In the present embodiment, the etching stopper layer 20 longer than the separator layer 6 in the Y-direction is formed on top of the separator layer 6. Next, similar to the second embodiment, after forming the second configuration member 3b, laminating the resist 21 and forming the slope $3b_1$, the etching stopper layer 20 is removed in a manner that the etching stopper layer 20 is aligned with the front end portion $3b_2$ of the slope $3b_1$, and the resist 21 is removed. Then, the main magnetic pole 4 is formed, and, at an appropriate timing, removal along the line 22 is performed. According to this configuration, the separator layer 6 can be more surely protected.

Figure 9:
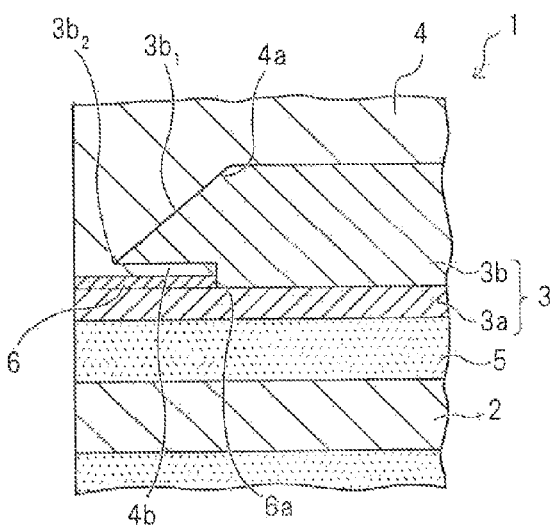
FIG. 9 is a cross-sectional view of a main part of a thermally-assisted magnetic recording head according to a fourth embodiment of the present invention.
Figure 10A:
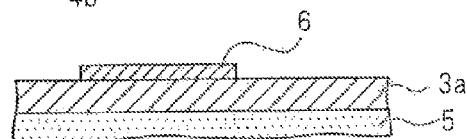
FIGS. 10A-10E are cross-sectional views sequentially illustrating main parts of a manufacturing method of the thermally-assisted magnetic recording head according to the fourth embodiment.
Figure 10B:
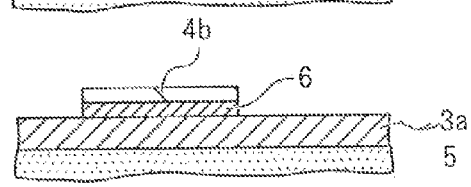
Figure 10C:
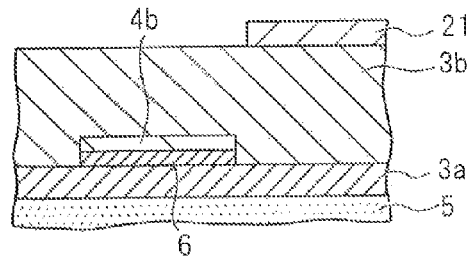
Figure 10D:
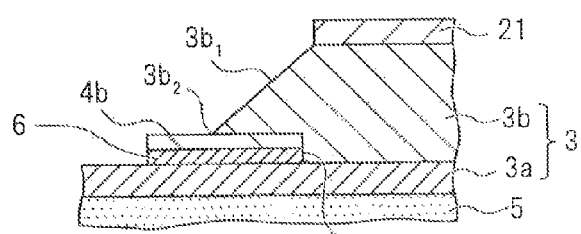
Figure 10E:
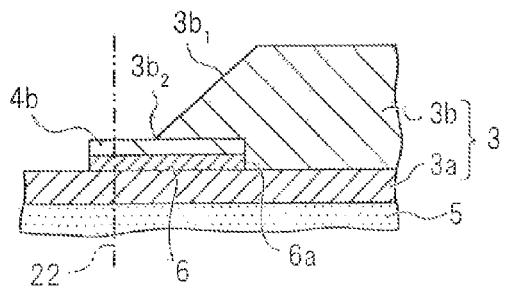

A fourth embodiment of the thermally-assisted magnetic recording head 1 of the present invention is illustrated in FIGS. 9-10E. In the present embodiment, an etching stopper layer 4b is formed of a magnetic material (for example, FeCo) same as that of the main magnetic pole 4. This etching stopper layer 4b remains unchanged after formation without being removed, and functions as a part of the main magnetic pole 4. That is, similar to the second embodiment, the separator layer 6 is formed on the first configuration member 3a (FIG. 10A). The etching stopper layer 4b having a length same as that of the separator layer 6 is formed (FIG. 10B). The second configuration member 3b is formed, and the resist 21 is laminated (FIG. 10C). The slope $3b_1$ is formed in the second configuration member $3b$ (FIG. 10D). Next, in the present embodiment, the resist 21 is removed without removing the etching stopper layer 20 in the manner to align the etching stopper layer 20 with the front end portion $3b_2$ of the slope $3b_1$ (FIG. 10E). Thereafter, the main magnetic pole 4 is formed, and, at an appropriate timing, removal along the line 22 is performed. According to the present embodiment, the separator layer 6 can be protected by preventing the separator layer 6 from being unintentionally removed. Next, since the etching stopper layer $4b$ can function as a part of the main magnetic pole 4, the distance between the main magnetic pole 4 and the first configuration member $3a$ of the plasmon generator 3 does not increase even without selective etching and the like. Therefore, the manufacturing of the magnetic recording head can be simplified. The etching stopper layer $4b$ is not limited to a material that is exactly the same as that of the main magnetic pole 4, and, for example, may have a multilayer structure that includes a metal layer containing at least one of Fe, Co and Ni and an under layer below the metal layer. When the etching stopper layer $4b$ is metallic, the thermal conductivity is good. Therefore, there is an effect of lowering the temperature of the plasmon generator 3.

Figure 11:
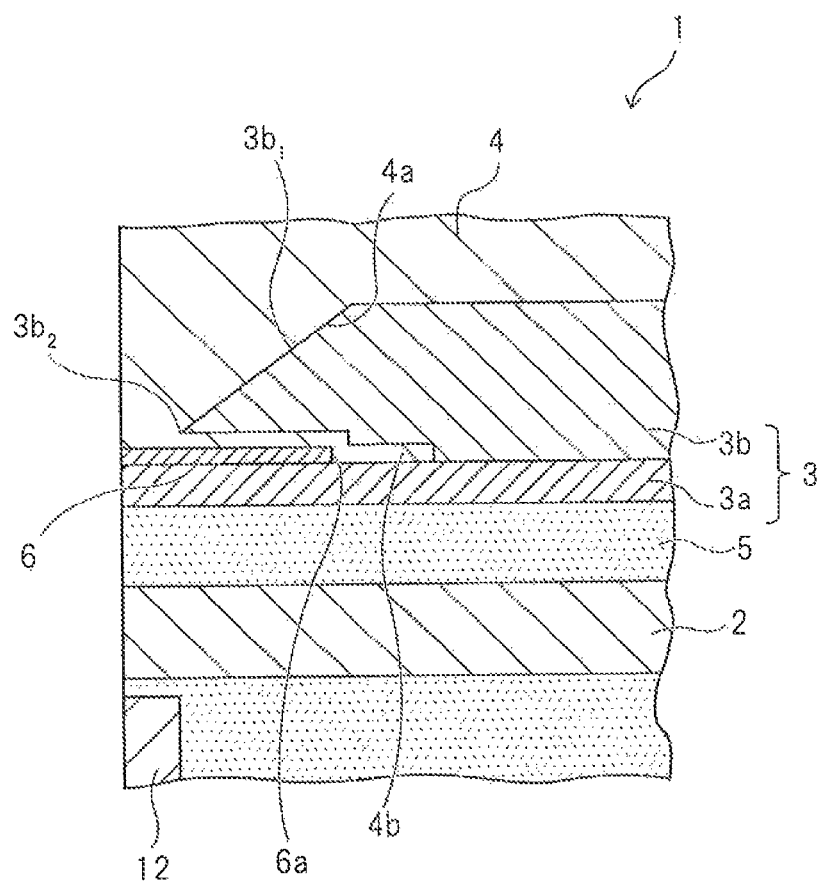
FIG. 11 is a cross-sectional view of a main part of a thermally-assisted magnetic recording head according to a fifth embodiment of the present invention.

A fifth embodiment of the thermally-assisted magnetic recording head 1 of the present invention is illustrated in FIG. 11. In the present embodiment, the etching stopper layer $4b$, which, similar to the fourth embodiment, functions as a part of the main magnetic pole 4, is formed in a manner similar to the third embodiment to cover the end part $6a$ of the separator layer 6. Other configurations are the same as the fourth embodiment. In the present embodiment, the etching stopper layer $4b$ longer than the separator layer 6 in the Y-direction is formed on top of the separator layer 6. Next, after forming the second configuration member $3b$, laminating the resist 21 and forming the slope $3b_1$, without removing the etching stopper layer $4b$ in a manner to align the etching stopper layer $4b$ with the front end portion $3b_2$ of the slope $3b_1$, the resist 21 is removed. Then, the main magnetic pole 4 is formed, and, at an appropriate timing, removal along the line 22 is performed. According to this configuration, the separator layer 6 can be more surely protected.

Figure 12:
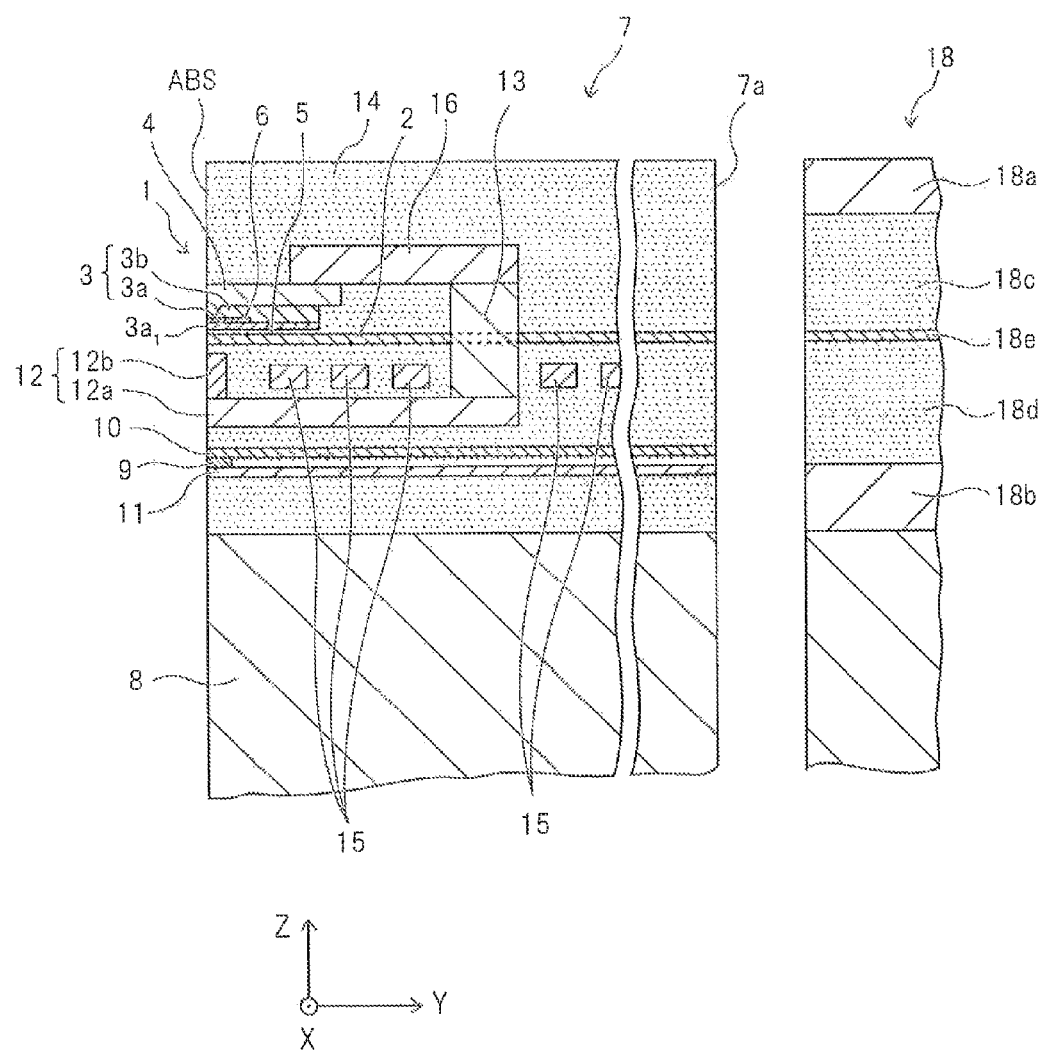
FIG. 12 is a cross-sectional view of a main part of a slider containing the thermally-assisted magnetic recording head according to the first embodiment of the present invention.

Next, a slider 7 containing the thermally-assisted magnetic recording head 1 of the present invention is explained. As illustrated in FIG. 12, which is a cross-sectional view of a main part of the slider 7, the slider 7 has a configuration in which an MR element 9 that configures a reproducing head part and the thermally-assisted magnetic recording head 1 that is a recording head part are laminated on top of a substrate 8 that is formed of ALTIC ($Al_2O_3$—TiC). In the example illustrated in FIG. 12, the above-described thermally-assisted magnetic recording head 1 of the first embodiment (see FIG. 1) is provided. In the following explanation, a "lamination direction" means a film formation direction in a wafer process and a direction orthogonal to a film surface, and corresponds to the Z-direction in each of the drawings. An "upward lamination direction" means a direction oriented from the substrate 8 toward an overcoat layer 14, and a "downward lamination direction" means a direction oriented from the overcoat layer 14 toward the substrate 8.

The slider 7 includes as the reproducing head part the MR element 9 having its front end portion exposed on the ABS, and an upper shield layer 10 and a lower shield layer 11 that are provided in a manner sandwiching the MR element 9 from upper and lower sides in the lamination direction. The MR element 9 may have an arbitrary configuration that uses a magnetoresistive effect, such as a CIP (Current In Plane)-GMR (Gigantic Magneto Resistive) element in which a sense current flows in a direction parallel to a film surface, a CPP (Current Perpendicular to Plane)-GMR element in which a sense current flows in a direction (the lamination direction) perpendicular to a film surface, and a TMR (Tunneling Magneto Resistive) element that uses a tunnel effect. When the MR element 9 is a CPP-GMR element or a TMR element, the upper shield layer 10 and the lower shield layer 11 are also used as electrodes supplying the sense current.

Further, the slider 7 is provided with as the recording head part the thermally-assisted magnetic recording head 1 for so-called perpendicular magnetic recording. The thermally-assisted magnetic recording head 1 has the main magnetic pole 4 for recording. The main magnetic pole 4 is connected to a yoke 16, and these are formed with alloys that are formed from any two or three of Ni, Fe and Co. In the downward lamination direction of the main magnetic pole 4, the return shield layer 12 is provided. The return shield layer 12 includes a first main body part $12a$ and a second main body part $12b$, and is formed with alloy that is formed from any two or three of Ni, Fe and Co. The yoke 16 that is connected to the main magnetic pole 4 and the return shield layer 12 are magnetically coupled to each other by a contact part 13. In the present embodiment, the return shield layer 12 is provided in the downward lamination direction of the main magnetic pole 4 and the yoke 16. However, the return shield layer 12 can also be provided in the upward lamination direction of the main magnetic pole 4 and the yoke 16. In the upward lamination direction of the main magnetic pole 4 and the yoke 16, the overcoat layer 14 formed of $Al_2O_3$ is provided.

Between the main magnetic pole 4 and yoke 16 and the return shield layer 12, a coil 15 is wound around the contact part 13. Magnetic flux can be generated by applying a current from outside to the coil 15. The coil 15 is formed from a conductive material such as Cu, and the number of turns of the coil 15 is not limited.

Although not illustrated in the drawings, the main magnetic pole 4 is focused toward the ABS in the direction (Z-direction) orthogonal to the film surface and the cross-track direction (X-direction). Generated magnetic flux in the interior of the main magnetic pole 4 is focused toward the ABS, and, from the front end portion located at the ABS, fine and strong writing magnetic flux 24 (see FIG. 1) suitable for high density recording is emitted toward the magnetic recording medium 17. As described above, the magnetic flux 24 emitted from the front end portion of the main magnetic pole 4 travels a U-shaped magnetic path, in which, after magnetizing each recording bit of the recording layer $17a$ along the perpendicular direction, the magnetic flux 24 changes orientation to pass through the under layer $17b$ and then changes orientation again to pass through the recording layer $17a$ to be absorbed by the return shield layer 12.

The second main body part $12b$ of the return shield layer 12 forms a leading shield part that has a broader layer cross section than the second main body part $12a$ in the cross-track direction (X-direction). By adopting such a configuration, magnetic field gradient between the return shield layer 12 and the main magnetic pole 4 in the vicinity of the ABS becomes steeper. As a result, signal output jitter is reduced so that error rate during reading can be reduced.

As described above, the waveguide 2 and the plasmon generator 3 are provided between the main magnetic pole 4 and the return shield layer 12. The waveguide 2 is a so-called core, and the cladding layer 5 having a refractive index lower than that of the waveguide 2 is provided. The waveguide 2 extends from the ABS to a back surface $7a$ of the slider 7 so as to be connected to a light source 18 (to be described later). Laser light incident from the light source 18 propagates toward the ABS while being totally reflected at the interface between the waveguide 2 and the cladding layer 5. The plasmon generator 3 includes the first configuration member 3a and the second configuration member 3b. The first configuration member 3a has the near-field light generation end surface $3a_1$ and the surface plasmon mode coupling part $3a_2$. The second configuration member 3b has the slope $3b_1$ and the front end portion $3b_2$ of the slope $3b_1$. The separator layer 6 is interposed between the first configuration member 3a and the second configuration member 3b and the main magnetic pole 4. The end part 6a of the separator layer 6 on the side opposite to the ABS is at a position that is more away from the ABS than the front end portion $3b_2$ of the slope $3b_1$ of the second configuration member 3b.

As illustrated in FIG. 12, on the back surface 7a of the slider 7, that is, the surface on the side opposite to the ABS, the light source 18 is coupled. The light source 18 is a laser diode, and includes a pair of electrodes 18a and 18b, P (Positive) type and N (Negative) type claddings 18c and 18d that are sandwiched by the electrodes 18a and 18b, and an active layer 18e positioned between the two claddings 18c and 18d, and a cleavage surface has a reflector structure. The light source 18 is fixed to the slider 7 using an appropriate method. The active layer 18e in which laser light is continuously oscillated is arranged on the same straight line as the waveguide 2 of the thermally-assisted magnetic recording head 1, and laser light 19 generated in the active layer 18e is incident onto the waveguide 2. The wavelength of the laser light 19 is not particularly limited, and, as an example, is about 800 nm.

Because of the configuration as described above, when magnetic recording to the magnetic recording medium 17 is performed by using the slider 7, power is supplied to the pair of electrodes 18a and 18b of the light source 18 that is coupled to the back surface 7a of the slider 7, and laser light is generated in the active layer 18e and is incident onto the waveguide 2 that opposes the active layer 18e. The incident laser light propagates through the waveguide 2 toward the ABS. The surface plasmon mode coupling part $3a_2$ of the plasmon generator 3 couples in a surface plasmon mode with the propagation light propagating through the waveguide 2 and generates surface plasmons. When the generated surface plasmons propagate toward the ABS and reach the near-field light generation end surface $3a_1$, near-field light is generated. By the near-field light, a portion of the recording layer 17a of the magnetic recording medium 17 is heated and the coercive force is reduced. At the same time as when such heating is performed, current is applied to a coil 15 to generate magnetic flux, which is emitted from the main magnetic pole 4, and writing of information to the magnetic recording medium 17 is performed. The near-field light generation end surface $3a_1$ that generates the near-field light in order to perform heating and the main magnetic pole 4 that generates the magnetic field in order to perform writing are close to each other. Therefore, writing of information to the portion, where the coercive force has been reduced due to heating, of the recording layer 17a of the magnetic recording medium 17 can be efficiently performed.

Figure 13:
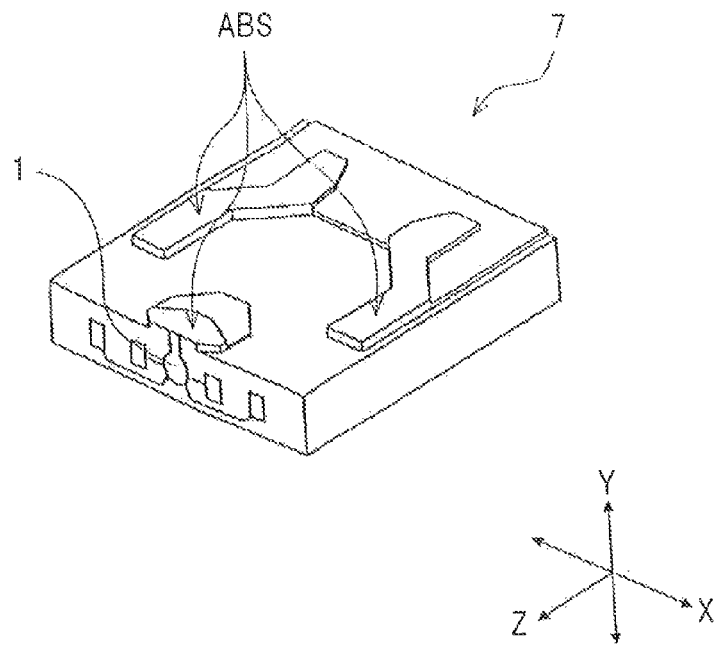
FIG. 13 is a perspective view of the slider illustrated in FIG. 12.
Figure 14:
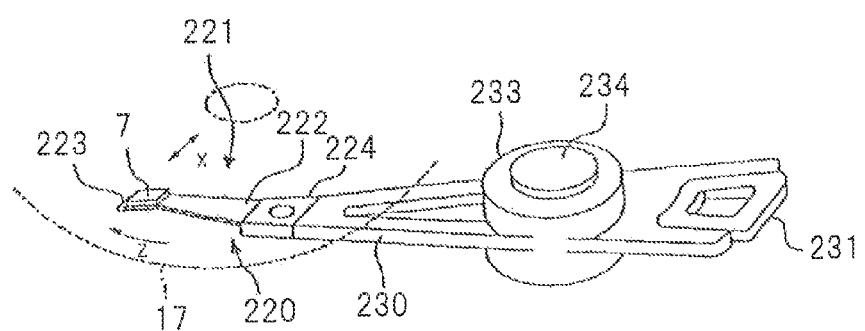
FIG. 14 is a perspective view of a head gimbal assembly containing the slider illustrated in FIGS. 12-13.

The slider 7 in which such a magnetic head 1 is formed is illustrated in FIG. 13. The slider 7 has a nearly hexahedral shape, and one of the six surfaces is the ABS that opposes the magnetic recording medium 17. As illustrated in FIG. 14, a head gimbal assembly 220 is provided with the slider 7 and a suspension 221 that elastically supports the slider 7. The suspension 221 includes a load beam 222 that is formed of stainless steel and has a shape of a plate spring, a flexure 223 that is provided on one end part of the load beam 222, and a base plate 224 that is provided on the other end part of the load beam 222. The slider 7 is bonded to the flexure 223, and an appropriate degree of freedom is provided to the slider 7. A gimbal part is provided for keeping a posture of the slider 7 constant on a portion of the flexure 223 on which the slider 7 is mounted.

The slider 7 is arranged inside a hard disk drive apparatus in a manner opposing the magnetic recording medium (hard disk) 17 that is a recording medium of a discotic shape and is rotatably driven. When the magnetic recording medium 17 rotates, air flow passing between the magnetic recording medium 17 and the slider 7 generates a lifting force on the slider 7 downward in the Y-direction. The slider 7 flies from the surface of the magnetic recording medium 17 due to the lifting force. The flying height can be finely adjusted by using thermal expansion of the slider 7 due to heating by a heater (not illustrated). The thin film magnetic recording head 1 is formed in the vicinity of an end part on an air outflow side of the slider 7 (end part on the lower left side in FIG. 13).

An assembly in which the head gimbal assembly 220 is mounted on an arm 230 is referred to as a head arm assembly. The arm 230 moves the slider 7 in the track crossing direction (X-direction) of the magnetic recording medium 17. One end of the arm 230 is mounted on the base plate 224. On the other end part of the arm 230, a coil 231 that forms a part of a voice coil motor is mounted. A bearing part 233 is provided in a middle portion of the arm 230. The arm 230 is rotatably supported by a shaft 234 mounted on the bearing part 233. The arm 230 and the voice coil motor that drives the arm 230 configure an actuator.

Figure 15:
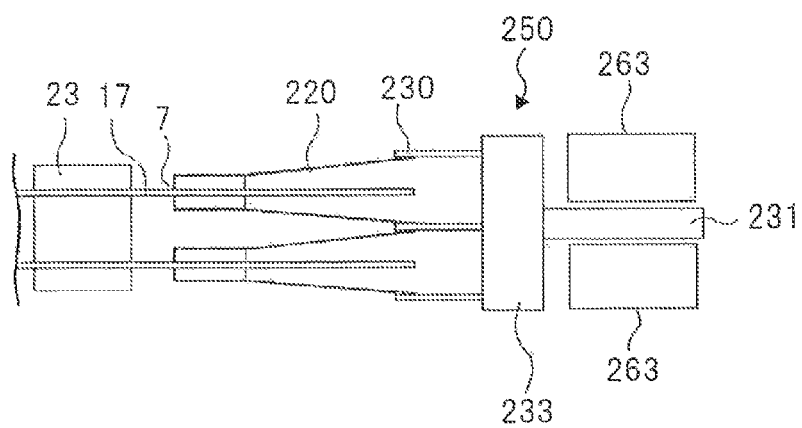
FIG. 15 is a side view of a main part of a hard disk drive apparatus containing the head gimbal assembly illustrated in FIG. 14.
Figure 16:
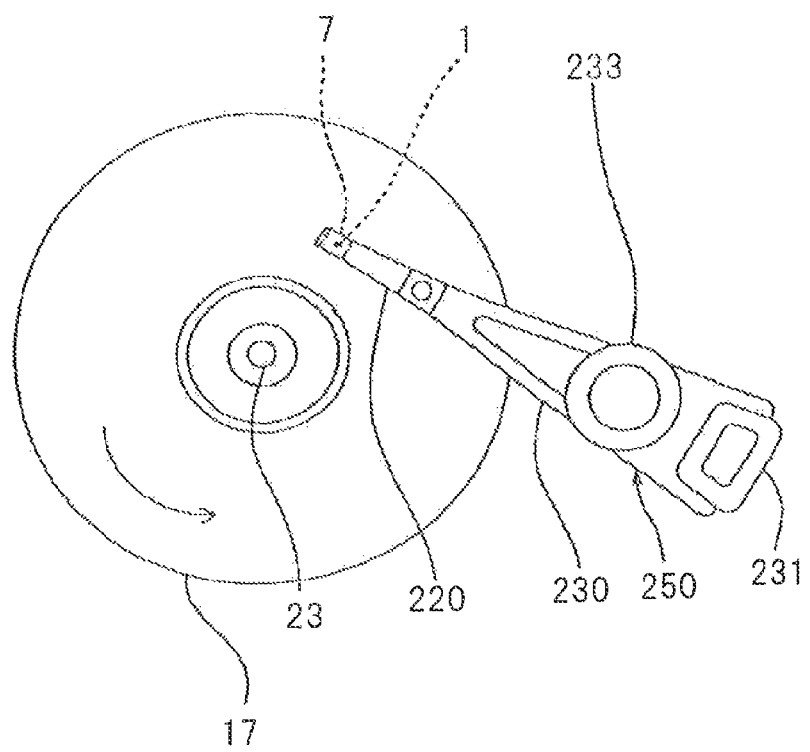
FIG. 16 is a plan view of the hard disk drive apparatus containing the head gimbal assembly illustrated in FIG. 14.

Next, a head stack assembly in which the above-described slider 7 is incorporated and a hard disk drive apparatus are explained. The head stack assembly is an assembly in which the head gimbal assembly 220 is mounted on each arm of a carriage that has a plurality of arms. FIG. 15 is a side view of the head stack assembly and FIG. 16 is a plan view of the hard disk drive apparatus. The head stack assembly 250 has a carriage that has a plurality of arms 230. The carriage configures the above-described bearing part 233. The head gimbal assemblies 220 are mounted on the arms 230 in a manner to align themselves in the perpendicular direction at intervals from each other. On an opposite side of the arm 230 of the carriage, the coil 231 that forms a part of the voice coil motor is mounted. The voice coil motor has permanent magnets 263 arranged at positions opposing each other across the coil 231.

Referring to FIGS. 15 and 16, the head stack assembly 250 is incorporated into the hard disk drive apparatus. The hard disk drive apparatus has a plurality of magnetic recording media 17 mounted to a spindle motor 23 that is a rotary holding mechanism. For each magnetic recording medium 17, two sliders 7 are arranged in a manner opposing each other across the magnetic recording medium 17. The head stack assembly 250 and the actuator, excluding the sliders 7, correspond to the device, support the sliders 7 and position the sliders 7 with respect to the magnetic recording media 17. The sliders 7 are moved by the actuator in the track crossing direction (X-direction) of the magnetic recording media 17 and are positioned with respect to the magnetic recording media 17. The magnetic recording head 1 that is a thin film recording head part contained in the slider 7 records magnetic information to the magnetic recording medium 17, and the MR element 9 that is a reproducing head part reproduces the information recorded in the magnetic recording medium 17.

The preferred embodiments of the present invention are presented and explained in detail. However, these explanations are exemplary. It should be understood that various changes and modifications are possible without departing from the spirit or scope of the appended claims.

What is claimed is:

1. A thermally-assisted magnetic recording head that has an air bearing surface opposing a magnetic recording medium and that performs magnetic recording while heating the magnetic recording medium by using near-field light, comprising:
   a waveguide through which incident light propagates toward the air bearing surface;
   a main magnetic pole of which one end part is positioned at the air bearing surface;
   a plasmon generator that is positioned between the waveguide and the main magnetic pole, that is provided along the waveguide in a manner opposing the waveguide, and of which one end part is positioned at the air bearing surface, the plasmon generator including:
      a first configuration member that extends to the air bearing surface; and
      a second configuration member that is provided to be in contact with the first configuration member or is integrally provided with the first configuration member, and that is in contact with main magnetic pole, the second configuration member terminating at a position recessed from the air bearing surface without extending to the air bearing surface, wherein
      the first configuration member has a near-field light generation end surface at the one end part positioned at the air bearing surface, and the second configuration member terminating at a front end portion of a slope positioned at the position recessed from the air bearing surface; and
   a separator layer that is interposed between the main magnetic pole and the first configuration member of the plasmon generator, and that extends from a position recessed from the air bearing surface to the air bearing surface, an end part of the separator layer on a side opposite to the air bearing surface being at a position more recessed from the air bearing surface than the front end portion of the slope of the second configuration member.

2. The thermally-assisted magnetic recording head according to claim 1, wherein
   the first configuration member of the plasmon generator couples in a surface plasmon mode with light propagating through the waveguide to generate surface plasmons, allows the surface plasmons to propagate toward the air bearing surface, and generates near-field light at the near-field light generation end surface.

3. The thermally-assisted magnetic recording head according to claim 2, further comprising:
   a cladding layer positioned between the waveguide and the plasmon generator.

4. The thermally-assisted magnetic recording head according to claim 1, further comprising
   an etching stopper layer between the separator layer and the second configuration member.

5. The thermally-assisted magnetic recording head according to claim 4, wherein
   the etching stopper layer includes a nonmagnetic body layer or a dielectric body layer, and extends, in a direction away from the air bearing surface, from the front end portion of the slope of the second configuration member to the end part of the separator layer on the side opposite to the air bearing surface or to a position beyond the end part.

6. The thermally-assisted magnetic recording head according to claim 4, wherein
   the etching stopper layer includes a magnetic body layer, and extends, in a direction away from the air bearing surface, from the air bearing surface to the end part of the separator layer on the side opposite to the air bearing surface or to a position beyond the end part.

7. A thermally-assisted magnetic recording head that has an air bearing surface opposing a magnetic recording medium and performs magnetic recording while heating the magnetic recording medium by using near-field light, comprising:
   a waveguide through which incident light propagates toward the air bearing surface;
   a main magnetic pole of which one end part is positioned at the air bearing surface;
   a plasmon generator that is positioned between the waveguide and the main magnetic pole, that is provided along the waveguide in a manner opposing the waveguide, and of which one end part is positioned at the air bearing surface, the plasmon generator including:
      a first configuration member that extends to the air bearing surface; and
      a second configuration member that is provided to be in contact with the first configuration member or is integrally provided with the first configuration member, and that is in contact with main magnetic pole, the second configuration member terminating at a position recessed from the air bearing surface without extending to the air bearing surface, wherein
      the first configuration member has a near-field light generation end surface at the one end part positioned at the air bearing surface, and the second configuration member terminating at a front end portion of a slope positioned at the position recessed from the air bearing surface; and
   a separator layer that is interposed between the main magnetic pole and the first configuration member of the plasmon generator, and that extends from a position recessed from the air bearing surface to the air bearing surface,
   the separator layer penetrating into on interior of the second configuration member, and a portion of the second configuration member overlapping on top of a portion of the separator layer.

8. A manufacturing method of a thermally-assisted magnetic recording head that has an air bearing surface opposing a magnetic recording medium and that performs magnetic recording while heating the magnetic recording medium by using near-field light, comprising:
   a step of forming a first configuration member on a waveguide, the waveguide allowing incident light to propagate therethrough toward the air bearing surface, the first configuration member extending to the air bearing surface along the waveguide in a manner opposing the waveguide and having a near-field light generation end surface on the air bearing surface;
   a step of forming a separator layer on the first configuration member, the separator layer extending from a position recessed from the air bearing surface to the air bearing surface;
   a step of forming a second configuration member on the separator layer and the first configuration member, the second configuration member terminating without extending to the air bearing surface, configuring a plasmon generator together with the first configuration member, and having a slope formed to have a front end portion at a position recessed from the air bearing surface, said front end portion being positioned closer to the air bearing surface than an end part of the separator layer on a side opposite to the air bearing surface, the second configuration member terminating at the front end portion of the slope; and a step of forming a main magnetic pole in contact with the second configuration member in such a manner that, at least at the air bearing surface, the main magnetic pole opposes the first configuration member via the separator layer.

9. The manufacturing method of a thermally-assisted magnetic recording head according to claim 8, wherein, in the step of forming the second configuration member, a portion of the second configuration member overlaps a portion of the separator layer.

10. The manufacturing method of a thermally-assisted magnetic recording head according to claim 9, wherein the first configuration member of the plasmon generator couples in a surface plasmon mode with light propagating through the waveguide to generate surface plasmons, allows the surface plasmons to propagate toward the air bearing surface, and generates near-field light at the near-field light generation end surface.

11. The manufacturing method of a thermally-assisted magnetic recording head according to claim 8, further comprising:

a step of forming a cladding layer on the waveguide, wherein the first configuration member is formed on the cladding layer.

12. The manufacturing method of a thermally-assisted magnetic recording head according to claim 8, wherein the step of forming the second configuration member comprises:

forming an etching stopper layer on the separator layer;
laminating a flat layer on the separator layer and the first configuration member; and
etching the laminated flat layer to form the slope to terminate the second configuration member at the front end portion of the slope.

13. The manufacturing method of a thermally-assisted magnetic recording head according to claim 12, wherein the etching stopper layer includes a nonmagnetic body layer or a dielectric body layer, and is formed to extend, in a direction away from the air bearing surface, to the end part of the separator layer on the side opposite to the air bearing surface or to a position beyond the end part, and, after the etching is completed, a portion of the separator layer in a region from the air bearing surface to the front end portion of the slope of the second configuration member is removed.

14. The manufacturing method of a thermally-assisted magnetic recording head according to claim 12, wherein the etching stopper layer includes a magnetic material layer, and is formed to extend, in a direction away from the air bearing surface, from the air bearing surface to the end part of the separator layer on the side opposite to the air bearing surface or to a position beyond the end part, and, after the etching is completed, remains without being removed and is brought into contact with the main magnetic pole to become a part of the main magnetic pole.

* * * * *